United States Patent
Wu et al.

(10) Patent No.: US 10,170,985 B1
(45) Date of Patent: Jan. 1, 2019

(54) APPARATUS FOR CURRENT ESTIMATION OF DC/DC CONVERTER AND DC/DC CONVERTER ASSEMBLY

(71) Applicant: NATIONAL CHUNG SHAN INSTITUTE OF SCIENCE AND TECHNOLOGY, Taoyuan (TW)

(72) Inventors: Chi-Sheng Wu, Taoyuan (TW); Kuo-Kuang Jen, Taoyuan (TW); Hsuang-Chang Chiang, Miaoli (TW); Tsang-Li Tai, Miaoli (TW)

(73) Assignee: NATIONAL CHUNG SHAN INSTITUTE OF SCIENCE AND TECHNOLOGY (TW)

( * ) Notice: Subject to any disclaimer, the term of this patent is extended or adjusted under 35 U.S.C. 154(b) by 0 days.

(21) Appl. No.: 15/833,263

(22) Filed: Dec. 6, 2017

(51) Int. Cl.
*H02M 3/335* (2006.01)
*H02M 1/00* (2006.01)
*H02M 3/156* (2006.01)

(52) U.S. Cl.
CPC .... *H02M 3/156* (2013.01); *H02M 2001/0009* (2013.01)

(58) Field of Classification Search
CPC ......... H02M 3/33507; H02M 3/33592; H02M 3/33546; H02M 2001/0009; H02M 7/48
See application file for complete search history.

(56) References Cited

U.S. PATENT DOCUMENTS

| | | | | |
|---|---|---|---|---|
| 6,381,159 | B2* | 4/2002 | Oknaian | H02M 3/156 323/282 |
| 8,780,590 | B2* | 7/2014 | So | H02M 3/33507 363/21.16 |
| 9,054,597 | B2* | 6/2015 | Zhao | H02M 1/4225 |
| 2010/0066337 | A1* | 3/2010 | Gong | H02M 1/4225 323/285 |
| 2011/0182089 | A1* | 7/2011 | genannt Berghegger | H02M 3/33507 363/21.13 |
| 2014/0159693 | A1* | 6/2014 | Kuang | H02M 1/42 323/285 |
| 2015/0048807 | A1* | 2/2015 | Fan | H02M 1/42 323/208 |
| 2015/0061521 | A1* | 3/2015 | Cohen | H05B 33/0815 315/200 R |

(Continued)

*Primary Examiner* — Timothy J Dole
*Assistant Examiner* — Sisay G Tiku
(74) *Attorney, Agent, or Firm* — Schmeiser, Olsen & Watts, LLP

(57) ABSTRACT

An apparatus for current estimation of a DC/DC converter includes a current sensing unit, a signal sampling unit, and a current estimator. The current sensing unit is for sensing a current passing through a switch of the DC/DC converter and converting the current into a voltage signal. The signal sampling unit, coupled to the current sensing unit, is for sampling the voltage signal so as to output a sampled signal. The current estimator, coupled to the signal sampling unit, is for determining a signal indicating estimated magnitude of an inductor current of the DC/DC converter, based on the sampled signal, a scale factor of the current sensing unit, a duty ratio of a driving signal for controlling the switch, an input voltage and an output voltage of the DC/DC converter. An apparatus for current estimation that can further control an averaged current of a DC/DC converter.

18 Claims, 6 Drawing Sheets

(56) References Cited

U.S. PATENT DOCUMENTS

| | | | |
|---|---|---|---|
| 2016/0190912 A1* | 6/2016 | Lim | G01R 21/006 |
| | | | 363/84 |
| 2017/0141684 A1* | 5/2017 | Beck | H02M 1/08 |
| 2017/0346405 A1* | 11/2017 | Lin | H02M 1/08 |
| 2018/0062523 A1* | 3/2018 | Rainer | H02M 3/33507 |
| 2018/0109197 A1* | 4/2018 | Quigley | H02M 3/33523 |

* cited by examiner

APPARATUS FOR CURRENT ESTIMATION OF DC/DC CONVERTER AND DC/DC CONVERTER ASSEMBLY

FIELD OF THE INVENTION

The present disclosure relates to current estimation technique for DC/DC converter, and in particular to apparatus for current estimation of a DC/DC converter and a DC/DC converter assembly.

BACKGROUND OF THE INVENTION

Switching DC/DC converters commonly require sensing inductor current for current control or monitoring purposes, such as time averaged current control, current sharing control, output current monitoring and so on. For example, a conventional step-down converter, or called buck converter, which steps down voltage (while stepping up current) from its input to its output (or load), includes a digitally-controlled transistor, a diode, an inductor, a capacitor bridged the output of the buck converter. For the sensing of the inductor current, a current sensing shunt including amplifier and low pass filter circuitry can be employed in parallel with a current sensing resistor connected between the diode and capacitor of the step-down converter. However, power dissipation of the whole circuit will be inevitably increased due to large current flowing through the current sensing resistor. Alternatively, a Hall effect sensor may be used. However, the Hall effect sensor has the problem of bandwidth limitation and is not suitable for sensing switching signals.

In another example, a current transformer can be applied to the above step-down converter instead of the current sensing resistor and current sensing shunt, without the bandwidth limitation and power loss increase for the other approaches. The current transformer, however, is useful only if AC current is to be measured or the sensed current is in pulse form because DC component may saturate the current transformer and thus measurement distortion occurs. In addition, the current sensing should be deliberately conducted in the discontinuous conduction mode of the step-down converter since the inductor current in the discontinuous conduction mode is asymmetrical, as compared to the symmetrical AC component of continuous conduction mode.

Thus, it is desirable to have improvements on the conventional current sensing approach in order to sense an inductor current for a DC/DC converter.

SUMMARY OF THE INVENTION

An objective of the present disclosure is to provide a current estimation technique for DC/DC converters, and in particular to an apparatus for current estimation of a DC/DC converter.

To achieve at least the above objective, the present disclosure provides an apparatus for current estimation of a DC/DC converter, comprising: a current sensing unit, a signal sampling unit, and a current estimator. The current sensing unit is for sensing a current passing through a switch of the DC/DC converter and converting the current into a voltage signal. The signal sampling unit, coupled to the current sensing unit, is for sampling the voltage signal so as to output a sampled signal. The current estimator, coupled to the signal sampling unit, is for determining a signal indicating estimated magnitude of an inductor current of the DC/DC converter, based on the sampled signal, a scale factor of the current sensing unit, a duty ratio of a driving signal for controlling the switch, an input voltage and an output voltage of the DC/DC converter.

In an embodiment, the current sensing unit includes: a current transformer and a resistor; the current transformer has a primary coil connected to the switch of the DC/DC converter and a secondary coil coupled to the resistor, wherein the scaling factor of the current sensing unit is an inverse of a resistance value of the resistor multiplied by a turn ratio of the current transformer.

In an embodiment, the duty ratio of the driving signal is equal to a ratio of a control signal to amplitude of a triangle signal, and the driving signal is a square signal based on the control signal and the triangle signal.

In an embodiment, the signal sampling unit is configured to be synchronized to the driving signal, wherein the signal sampling unit samples the voltage signal at a middle of an ON period of the driving signal so as to output the sampled signal.

In an embodiment, the DC/DC converter is a buck converter, the current estimator determines the signal indicating estimated magnitude of the inductor current of the DC/DC converter, based on multiplication of the sampled signal, the scale factor of the current sensing unit, the duty ratio of the driving signal for controlling the switch, and a ratio of the input voltage to the output voltage of the DC/DC converter when the DC/DC converter is in a continuous or discontinuous conduction mode.

In an embodiment, the DC/DC converter is a boost converter, the current estimator determines the signal indicating estimated magnitude of the inductor current of the DC/DC converter, based on multiplication of the sampled signal, the scale factor of the current sensing unit, the duty ratio of the driving signal for controlling the switch, and a ratio of the output voltage to difference between the output voltage and the input voltage when the DC/DC converter is in a continuous or discontinuous conduction mode.

In an embodiment, the DC/DC converter is a buck-boost converter, the current estimator determines the signal indicating estimated magnitude of the inductor current of the DC/DC converter, based on multiplication of the sampled signal, the scale factor of the current sensing unit, the duty ratio of the driving signal for controlling the switch, and a ratio of sum of the output voltage and the input voltage to the output voltage when the DC/DC converter is in a continuous or discontinuous conduction mode.

In an embodiment, the current estimator determines the signal indicating estimated magnitude of the inductor current of the DC/DC converter, based on the sampled signal and the scale factor of the current sensing unit when the DC/DC converter is in a continuous conduction mode.

In an embodiment, the apparatus further comprises: a low pass filter, a current controller, and a voltage controller. The low pass filter, electrically coupled between the current estimator and a control unit of the DC/DC converter, is for filtering a voltage control signal into the control signal. The current controller, electrically coupled between the control unit and the current estimator, is for outputting the voltage control signal based on difference between a current control signal and the signal indicating estimated magnitude of the inductor current of the DC/DC converter. The voltage controller, electrically coupled to the current controller, is for outputting the current control signal based on difference between a command voltage signal and the output signal of the DC/DC converter.

In an embodiment, the control unit, electrically coupled to the switch of the DC/DC converter, is for outputting the driving signal for controlling the switch.

In an embodiment, the control unit includes: a pulse width modulation device for generating a pulse width modulation signal according to the voltage control signal; and a driving device for outputting the driving signal based on the pulse width modulation signal.

To achieve at least the above objective, the present disclosure provides a DC/DC converter assembly comprising: a DC/DC converter and an apparatus for current estimation of the DC/DC converter, as exemplified in any one of the above embodiments.

DETAILED DESCRIPTION OF THE PREFERRED EMBODIMENTS

To facilitate understanding of the object, characteristics and effects of this present disclosure, embodiments together with the attached drawings for the detailed description of the present disclosure are provided.

Figure 1:
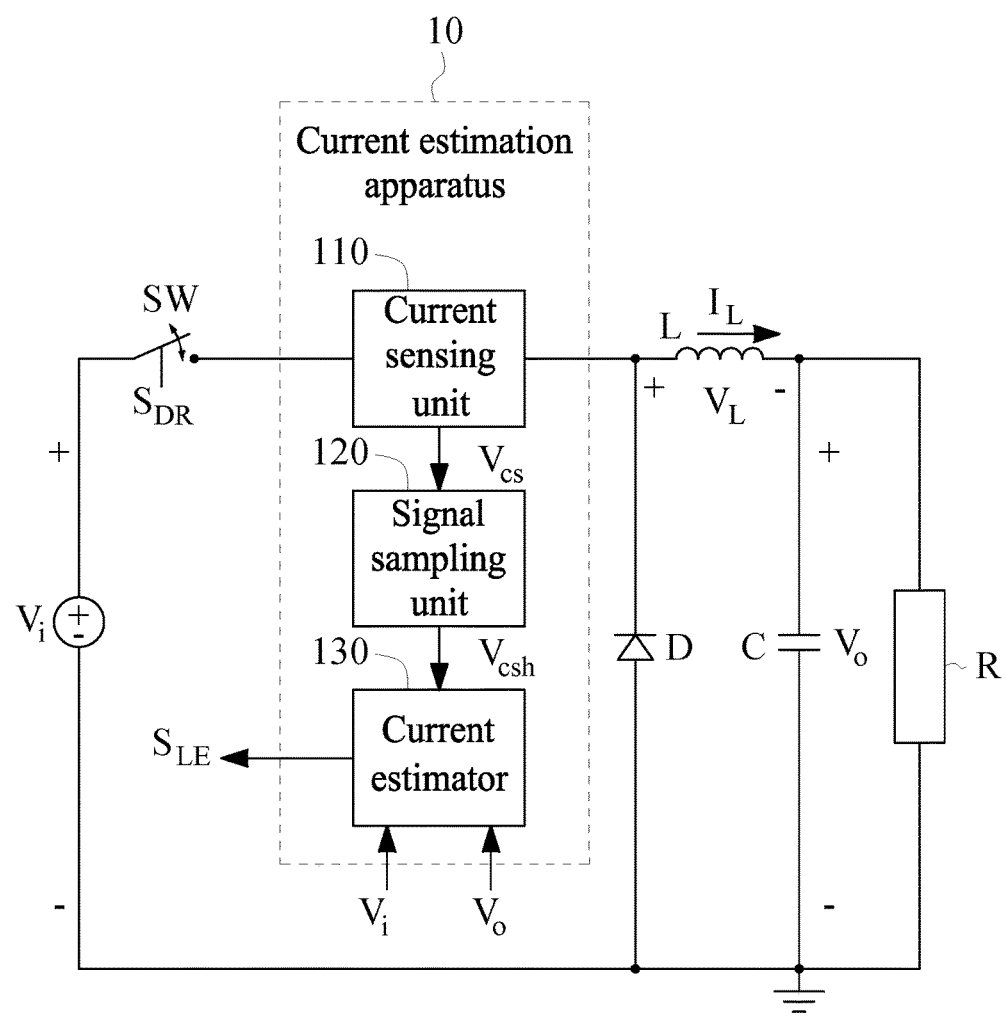
FIG. 1 is a schematic diagram illustrating an apparatus for current estimation of a DC/DC converter according to an embodiment of the present disclosure.

Referring to FIG. 1, an apparatus for current estimation, such as a current estimation apparatus 10, for a DC/DC converter is illustrated in a schematic diagram, according to an embodiment of the present disclosure. As shown in FIG. 1, the current estimation apparatus 10 is connected to a DC/DC converter, such as a buck converter including a switch SW, a diode D, an inductor L, a capacitor C bridged the output (such as an output load R) of the buck converter, where $I_L$ and $V_L$ indicate current and voltage of the inductor L. The current estimation apparatus 10 is provided for the estimation of magnitude of the inductor current $I_L$, for example, an averaged inductor current, and includes: a current sensing unit 110, a signal sampling unit 120, and a current estimator 130. The current sensing unit 110 is utilized for sensing a current passing through the switch SW of the DC/DC converter and converting the current into a voltage signal $V_{cs}$. The signal sampling unit 120, coupled to the current sensing unit 110, is utilized for sampling the voltage signal $V_{cs}$ so as to output a sampled signal $V_{csh}$. The current estimator 130, coupled to the signal sampling unit 120, is utilized for determining a signal $S_{LE}$ indicating estimated magnitude of the inductor current $I_L$ of the DC/DC converter, based on the sampled signal $V_{csh}$, a scale factor of the current sensing unit 110, a duty ratio of a driving signal $S_{DR}$ for controlling the switch SW, an input voltage $V_i$ and an output voltage $V_o$ of the DC/DC converter. For the sake of illustration, the current estimation apparatus 10 is provided for a buck converter. In addition, the current estimation apparatus 10 can be implemented for other type of DC/DC converters, such as boost converter, buck-boost converter, and so on; examples will be shown later.

Figure 2:
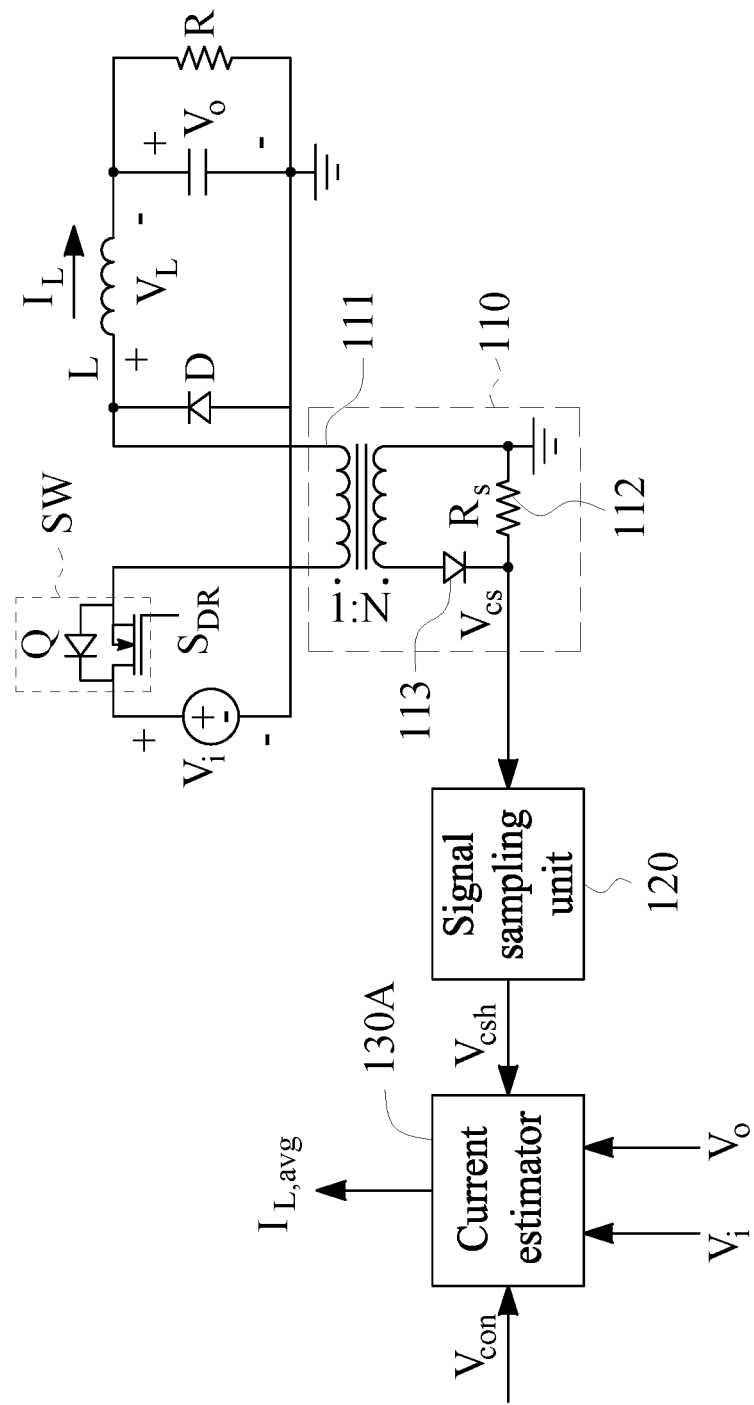
FIG. 2 is a schematic diagram of an example of a current estimation apparatus for a buck converter according to FIG. 1.

Referring to FIG. 2, for example, a current estimation apparatus for a buck converter is illustrated according to FIG. 1. In this example, the current sensing unit 110 includes: a current transformer 111 and a resistor 112; the current transformer 111 has a primary coil connected to the switch SW, such as a transistor, and a secondary coil electrically coupled to the resistor 112. The current transformer 111 has a turn ratio of 1/N and the resistor 112 has a resistance value $R_s$. The current sensing unit 110 can also include a diode 113 connected to the resistor 112. In this manner, the current sensing unit 110 senses the current passing through the switch SW, e.g., a transistor Q, of the DC/DC converter and converting the current into a voltage signal $V_{cs}$.

Figure 3:
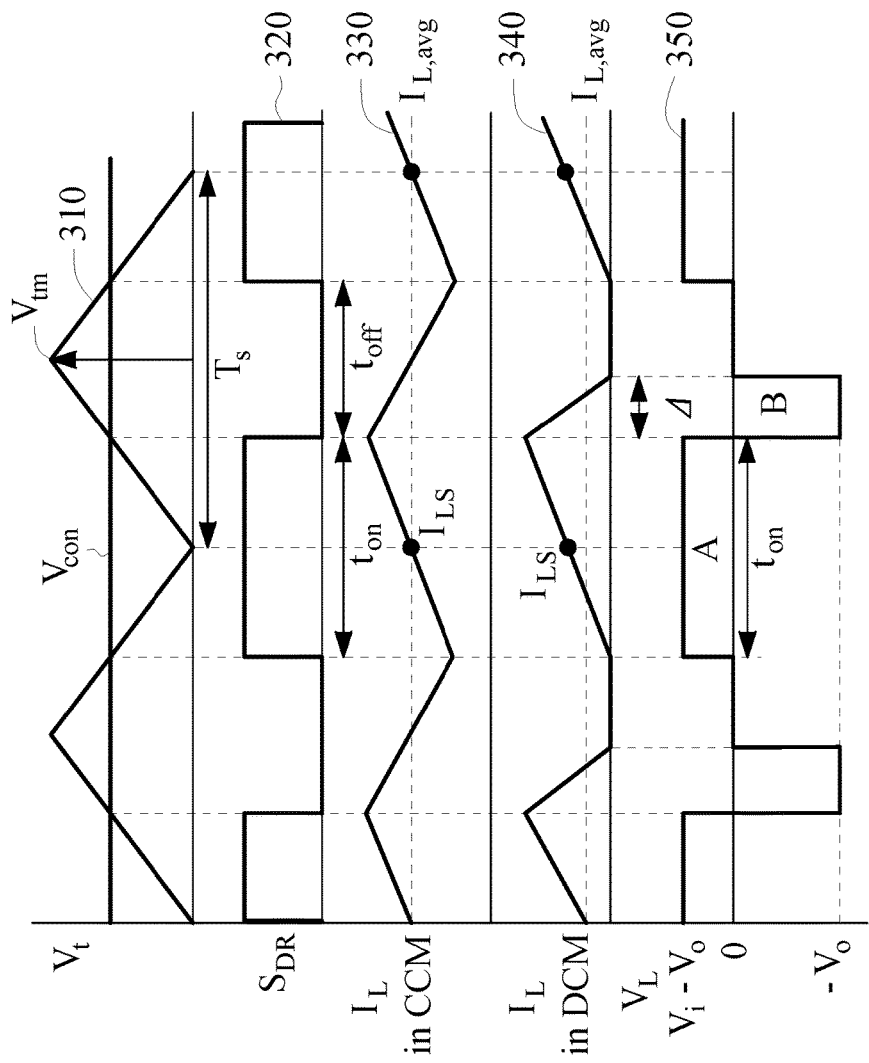
FIG. 3 is a waveform diagram of an example of signals for the DC/DC converter in FIG. 2.

For the estimation of magnitude of the inductor current $I_L$ such as an averaged inductor current, denoted by $I_{L,avg}$, in an embodiment, the signal sampling unit 120, e.g., a sample-and-hold circuit or analog-to-digital converter, is configured to be synchronized to the driving signal $S_{DR}$. Referring to FIG. 3, the driving signal $S_{DR}$, for example, is a square waveform 320 having a duty ratio D equal to $t_{on}/T_s$, where $T_s=t_{on}+t_{off}$, which can be obtained by using a pulse-width modulation (PWM) technique that compares a control signal $V_{con}$ to a triangle signal $V_t$, as illustrated by a triangular waveform 310 with amplitude $V_{tm}$, where the duty ratio D can be expressed by $V_{con}/V_{tm}$. The signal sampling unit 120 samples the voltage signal $V_{cs}$ at a middle of each ON period over a time interval of the driving signal $S_{DR}$ so as to output the sampled signal $V_{csh}$. In a continuous conduction mode (CCM) of the DC/DC converter, the sampled signal $V_{csh}$ is related to an inductor current value $I_{LS}$ of the inductor current $I_L$ that is equal to the averaged inductor current $I_{L,avg}$, as illustrated in a current waveform 330 of FIG. 3, and can be determined by the following equation:

$$I_{LS}=(N/R)V_{csh} \quad \text{(Eq. 1)}$$

In a discontinuous conduction mode (DCM) of the DC/DC converter, the inductor current value $I_{LS}$ of the inductor current $I_L$ is greater than the averaged inductor current $I_{L,avg}$, as illustrated in a current waveform 340 of FIG. 3. The averaged inductor current $I_{L,avg}$ can be determined in terms of the inductor current value $I_{LS}$ and the interval (denoted by $\Delta$) from the beginning of the OFF state of the switch SW to the time where the inductor current $I_L$ is reduced to zero, according to area ($I_{LS}(t_{on}+\Delta)$) of the inductor current $I_L$ in one period $T_S$, as follows:

$$I_{L,avg} = \frac{I_{Ls}(t_{on} + \Delta)}{T_s} \quad \text{(Eq. 2)}$$

In addition, the average of the inductor voltage $V_L$ in static state during a switching period is equal to zero, according to the principle of voltage-second balance. For the inductor voltage $V_L$ of the buck converter, as illustrated in the voltage waveform 350 of FIG. 3, area A is equal to area B, and it yields that:

$$(V_i-V_o)t_{on}+(-V_o)\Delta=0 \quad \text{(Eq. 3)}$$

By equation 3, the interval $\Delta$ can be expressed by:

$$\Delta = \frac{V_i - V_o}{V_o} t_{on} \quad \text{(Eq. 4)}$$

In addition, the duty ratio (or duty cycle) can be expressed by:

$$D = \frac{t_{on}}{T_S} = \frac{v_{con}}{V_{tm}} \quad \text{(Eq. 5)}$$

The averaged inductor current $I_{L,avg}$ can be determined by substituting equations 4 and 5 into equation 2:

$$I_{L,avg} = I_{LS} \frac{t_{on}}{T_s} \frac{V_i}{V_o} = I_{LS} \frac{v_{con}}{V_{tm}} \frac{V_i}{V_o} \quad \text{(Eq. 6)}$$

Equation 6 indicates that when the DC/DC converter is in the discontinuous conduction mode, the averaged inductor current $I_{L,avg}$ can be obtained based on the inductor current value $I_{LS}$ (sampled at the middle of the ON period), the control signal $V_{con}$ for the pulse width modulation, the amplitude of the triangle signal $V_t$, the input voltage $V_i$ and the output voltage $V_o$ of the DC/DC converter.

In general, equation 6 can be expressed in terms of the duty ratio and $V_{csh}$ by substituting equations 1 and 5 into equation 6 as below:

$$I_{L,avg} = V_{csh} \frac{N}{R_s} D \frac{V_i}{V_o} \quad \text{(Eq. 7)}$$

Equation 7 indicates that the averaged inductor current $I_{L,avg}$ can be obtained based on multiplication of the sampled signal $V_{csh}$, a scale factor of the current sensing unit 110, the duty ratio of the driving signal $S_{DR}$, and a ratio of the input voltage $V_i$ to the output voltage $V_o$ of the DC/DC converter, wherein the scaling factor of the current sensing unit 110 is an inverse of the resistance value $R_s$ multiplied by the turn ratio (e.g., 1/N) of the current transformer 110.

In addition, equation 6 or 7 serves as a general equation for determination of the averaged inductor current $I_{L,avg}$ because the ratio $V_i/V_o$ equals 1/D in the continuous conduction mode, leading to $I_{L,avg}$=ILs=(N/$R_s$)$V_{csh}$, i.e., the same as equation 1. Furthermore, it is noted that equation 7 can be viewed as a general equation for the buck converter of FIG. 2, regardless of how the control signal $V_{con}$ is compared to the triangle signal $V_t$ to generate the driving signal $S_{DR}$.

Referring to FIG. 2, a current estimator 130A (which is an example of the current estimator 130 in FIG. 1) can be configured to determine a signal $S_{LE}$ indicating estimated magnitude of the inductor current $I_L$, based on equation 6 or 7. The current estimator 130 may include a processor, microcontroller, digital signal processor, system on a chip (SOC), field programmable gate array (FPGA) and application-specific integrated circuit (ASIC) so as to compute the value of the signal $S_{LE}$ indicating estimated magnitude of the inductor current $I_L$ of the DC/DC converter. Hence, the averaged inductor current $I_{L,avg}$ can be calculated and outputted in digital manner. Furthermore, the signal sampling unit 120 and current estimator 130 may be combined and implemented by at least one electronic component which has built-in sample-and-hold or analog-to-digital circuit, such as microcontroller and so on.

In other examples, the current estimator 130 can be implemented by using one or more analog computation components, such as an analog multiplier, division device, or computational unit, for producing the signal $S_{LE}$ indicating estimated magnitude of the inductor current $I_L$. Hence, the averaged inductor current $I_{L,avg}$ can also be calculated and outputted in analog manner. However, the present disclosure is not limited to the above examples of the current estimator 130.

In the embodiment above, the averaged inductor current $I_{L,avg}$ of the buck converter, as illustrated in FIG. 2, is derived by sampling the voltage signal $V_{cs}$ at a middle of each ON period and adopting the principle of voltage-second balance. This approach can be further applied to other type of DC/DC converters for the determination of the averaged inductor current.

Figure 4:
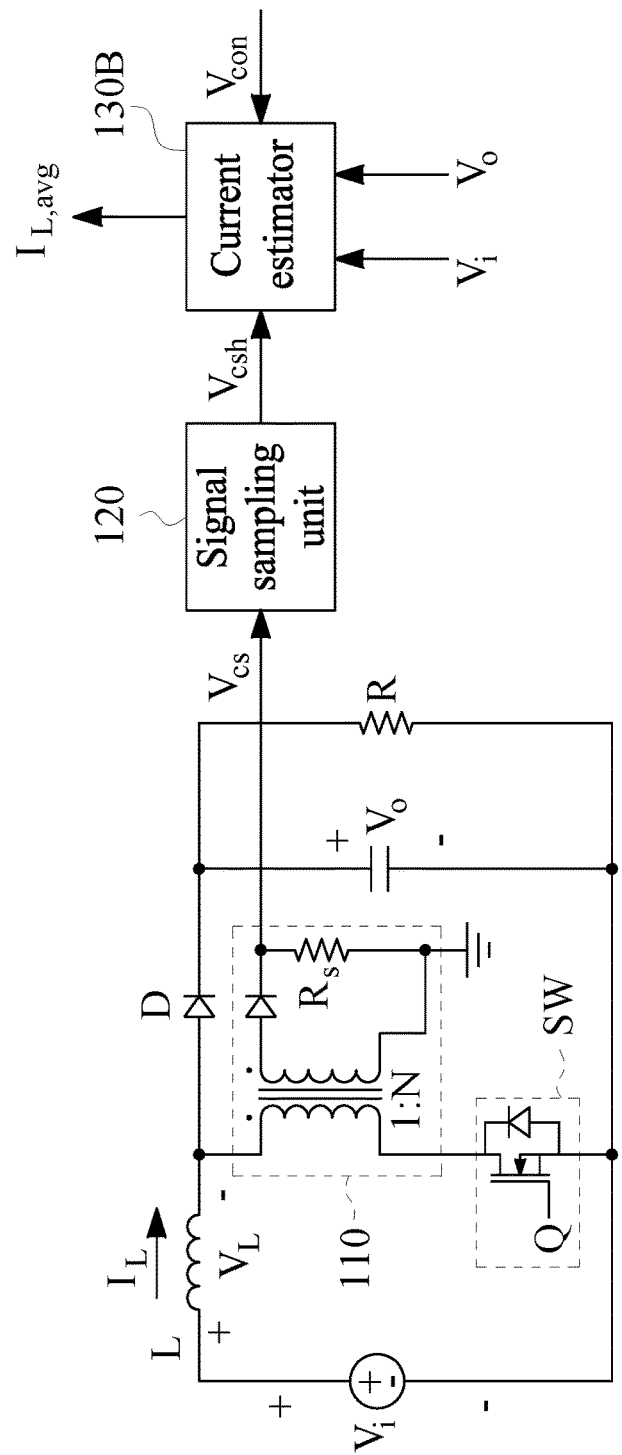
FIG. 4 is a schematic diagram illustrating a current estimation apparatus for a boost converter according to another embodiment of the present disclosure.

Referring to FIG. 4, a current estimation apparatus for a boost converter is illustrated, according to another embodiment of the present disclosure. The embodiment of FIG. 4 differs from that of FIG. 2 in that the circuit connection and current computation for the current estimation apparatus of FIG. 4 are configured for a boost converter (or a step-up converter). In a general sense, the current estimation apparatus of FIG. 4 determines a signal $S_{LE}$ indicating estimated magnitude of the inductor current $I_L$ of the boost converter, based on the sampled signal $V_{csh}$, the scale factor of the current sensing unit 110, a duty ratio of a driving signal $S_{DR}$ for controlling the switch SW, an input voltage $V_i$ and an output voltage $V_o$ of the boost converter. For example, the current estimation apparatus of FIG. 4 (which is an example of the current estimator 130 in FIG. 1) includes a current estimator 130B for determining the signal indicating estimated magnitude of the inductor current, based on multiplication of the sampled signal $V_{csh}$, the scale factor of the current sensing unit 110, the duty ratio of the driving signal for controlling the switch, and a ratio of the output voltage $V_o$ to difference between the output voltage $V_o$ and the input voltage $V_i$ when the boost converter is in a continuous or discontinuous conduction mode. Specifically, the averaged inductor current $I_{L,avg}$ can be determined by the following equation:

$$I_{L,avg} = V_{csh} \frac{N}{R_s} D \frac{V_o}{V_o - V_i} \quad \text{(Eq. 8)}$$

In equation 8, D is the duty ratio of the driving signal $S_{DR}$ for the boost converter. D is equal to $V_{con}/V_{tm}$ provided that the driving signal $S_{DR}$ is generated in a manner similar to that as illustrated by using the control signal $V_{con}$ and triangle signal $V_t$ in FIG. 3. The current estimator 130B can be implemented in any manner of the current estimator 130B as exemplified above.

Figure 5:
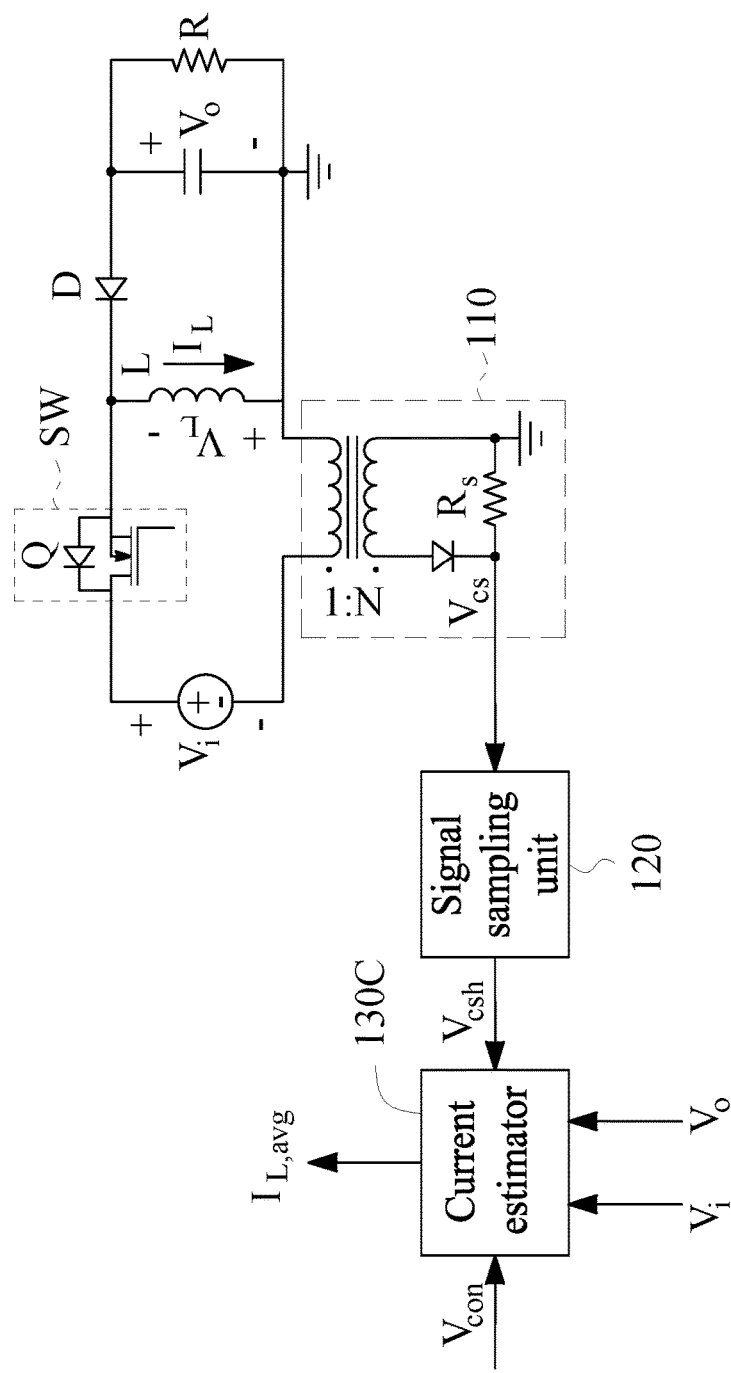
FIG. 5 is a schematic diagram illustrating a current estimation apparatus for a buck-boost converter according to another embodiment of the present disclosure.

Referring to FIG. 5, a current estimation apparatus for a buck-boost converter is illustrated according to another embodiment. The embodiment of FIG. 5 differs from that of FIG. 2 in that the circuit connection and current computation for the current estimation apparatus of FIG. 5 are configured for a buck-boost converter (or a step-up/step-down converter). In a general sense, the current estimation apparatus of FIG. 5 determines a signal $S_{LE}$ indicating estimated magnitude of the inductor current $I_L$ of the buck-boost converter, based on the parameters similar to those of the embodiment illustrated in FIG. 1, 2, or 4. For example, the current estimation apparatus of FIG. 5 includes a current estimator 130C (which is an example of the current estimator 130 in FIG. 1) for determining a signal indicating estimated magnitude of the inductor current of the buck-boost converter, based on multiplication of the sampled signal $V_{csh}$, the scale factor of the current sensing unit 110, the duty ratio of the driving signal for controlling the switch, and a ratio of sum of the output voltage $V_o$ and the input voltage $V_i$ to the output voltage $V_o$ when the buck-boost converter is in a continuous or discontinuous conduction mode. Specifically, the averaged inductor current $I_{L,avg}$ can be determined by the following equation:

$$I_{L,avg} = V_{csh} \frac{N}{R_s} D \frac{V_o + V_i}{V_o} \qquad \text{(Eq. 9)}$$

In equation 9, D indicates the duty ratio of the driving signal $S_{DR}$ for the buck-boost converter. D is equal to $V_{con}/V_{tm}$ provided that the driving signal $S_{DR}$ is generated in a manner similar to that as illustrated by using the control signal $V_{con}$ and triangle signal $V_t$ in FIG. 3. The current estimator 130C can be implemented in any manner of the current estimator 130B as exemplified above.

In any of the embodiments of the present disclosure, the current estimator 130 (e.g., 130A, 130B, or 130C) can be configured in other manners. For example, the current estimator 130 (e.g., 130A, 130B, or 130C) can be configured to determine whether the DC/DC converter is in the continuous or discontinuous conduction mode; to output a signal $S_{LE}$ indicating estimated magnitude of the inductor current $I_L$, based on the sampled signal $V_{csh}$ and the scale factor of the current sensing unit 110, e.g., as in equation 1, when it is determined that the DC/DC converter is in the continuous conduction mode; and to output the signal $S_{LE}$, e.g., based on any of the equations 6 to 9 depending on the type of the DC/DC converter, when the DC/DC converter is in the discontinuous conduction mode.

In other embodiments, the apparatus for current estimation can further be utilized to determine the control signal $V_{con}$ for the generation of the driving signal $S_{DR}$. In other words, the current estimation in these embodiments further serves as an apparatus for the control of averaged current of the DC/DC converter.

Figure 6:
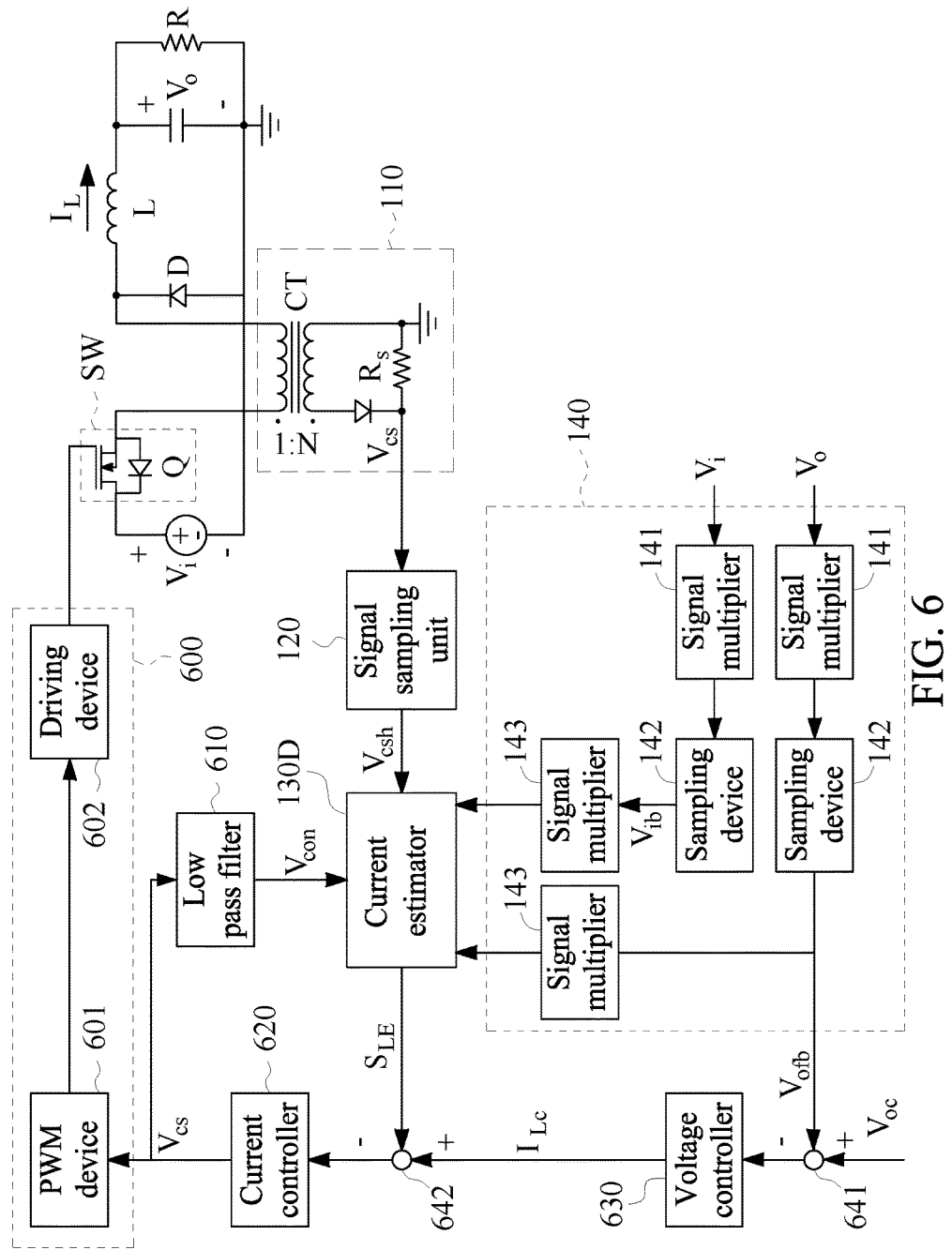
FIG. 6 is a schematic diagram illustrating an apparatus for current estimation of the buck converter according to an embodiment of the present disclosure.

Referring to FIG. 6, an apparatus for current estimation of the buck converter is illustrated according to an embodiment of the present disclosure. The apparatus for current estimation includes a current sensing unit 110, a signal sampling unit 120, and a current estimator 130D. The current sensing unit 110, signal sampling unit 120, and current estimator 130D can be implemented similarly as illustrated above in the embodiments of FIG. 2. The apparatus for current estimation further includes: a low pass filter 610, a current controller 620, and a voltage controller 630. The low pass filter 610, electrically coupled between the current estimator 130D and a control unit 600 of the DC/DC converter, is employed for filtering a voltage control signal $V_{cs}$ into the control signal $V_{con}$. The current controller 620, electrically coupled between the control unit 600 and the current estimator 130D, is utilized for outputting the voltage control signal $V_{cs}$ based on difference between a current control signal $I_{Lc}$ and the signal $S_{LE}$ indicating estimated magnitude of the inductor current of the DC/DC converter. The voltage controller 630, electrically coupled to the current controller, is employed for outputting the current control signal $I_{Lc}$ based on difference between a command voltage signal $V_{oc}$ and the digital signal $V_{ofb}$ which presents the amplified output signal of the DC/DC converter.

Furthermore, a signal conditioning unit 140 may be included for sensing the input signal $V_i$ and output signal $V_o$ of the DC/DC converter and outputting the conditioned signals to the current estimator 130D for computation, as illustrated in FIG. 6. The signal conditioning unit 140 includes signal multipliers 141, 143 and sampling devices 142, wherein the signal multiplier 141 has a voltage sensing factor of $K_v$ and the signal multiplier 143 has a voltage sensing factor of $1/K_v$.

As shown in FIG. 6, the input signal $V_i$ and output signal $V_o$ of the DC/DC converter are sampled and thus digital signals $V_{ib}$ and $V_{ofb}$ are obtained, respectively. The difference between a command voltage signal $V_{oc}$ and the digital signal $V_{ofb}$ is obtained through a subtraction device (or a comparator) 641 and regulated by the voltage controller 630 so as to output the current control signal $I_{Lc}$. In addition, the current estimator 130D outputs the signal $S_{LE}$ indicating estimated magnitude of the inductor current of the DC/DC converter, for example, based on equation 6. The difference between the current control signal $I_{Lc}$ and the signal $S_{LE}$ is obtained through a subtraction device (or a comparator) 642 and regulated by the current controller 620 so as to output the voltage control signal $V_{cs}$ to the control unit 600 and the low pass filter 610. The low pass filter 610 filters voltage control signal $V_{cs}$ into the control signal $V_{con}$ so as to reduce a loop gain of the feedback loop including the current controller 620 and the current estimator 130D, resulting in a stable feedback loop for the generation of the driving signal $S_{DR}$ for controlling the switch SW of the buck converter.

For example, the control unit 600, electrically coupled to the switch of the DC/DC converter, is utilized for outputting the driving signal $S_{DR}$ for controlling the switch. For example, the control unit 600 includes: a pulse width modulation device 601 and a driving device 602. The pulse width modulation device 601 is employed to generate a pulse width modulation signal according to the voltage control signal $V_{cs}$. The driving device 602 is utilized for outputting the driving signal $S_{LE}$ based on the pulse width modulation signal.

Likewise, the apparatus for current estimation of the buck converter, as illustrated in FIG. 6, can be modified and applied to the boost converter of FIG. 4 and the buck-boost converter of FIG. 5, based on equation 8 and 9, respectively.

The embodiments of the apparatuses for current estimation of DC/DC converters are provided as above, which facilitate accurate current estimation of the DC/DC converters in either continuous or discontinuous conduction mode. In addition, some embodiments can further enhance accuracy of the current estimation and control of the DC/DC converters in either continuous or discontinuous conduction mode. Hence, the complexity of the circuit implementation and the cost for current estimation and control for DC/DC converters will be reduced.

Furthermore, in other embodiments, a DC/DC converter assembly is provided, comprising: a DC/DC converter and an apparatus for current estimation of the DC/DC converter. The DC/DC converter is a buck converter, boost converter, or buck-boost converter, for example, as illustrated in any of the above embodiments based on FIG. 2, 4, 5, or 6. The apparatus for current estimation of the DC/DC converter, for example, is exemplified in any one of the above embodiments.

While the present disclosure has been described by means of specific embodiments, numerous modifications and variations could be made thereto by those skilled in the art without departing from the scope and spirit of the present disclosure set forth in the claims.

What is claimed is:

1. An apparatus for current estimation of a DC/DC converter, comprising:
   a current sensing unit for sensing a current passing through a switch of the DC/DC converter and converting the current into a voltage signal;
   a signal sampling unit, coupled to the current sensing unit, for sampling the voltage signal so as to output a sampled signal; and
   a current estimator, coupled to the signal sampling unit, for determining a signal indicating estimated magnitude of an inductor current of the DC/DC converter, based on the sampled signal, a scale factor of the current sensing unit, a duty ratio of a driving signal for controlling the switch, an input voltage and an output voltage of the DC/DC converter,
   wherein the signal sampling unit is configured to be synchronized to the driving signal, and the signal sampling unit samples the voltage signal at a middle of each ON period of the driving signal so as to output the sampled signal.

2. The apparatus according to claim 1, wherein the current sensing unit includes:
   a current transformer, a primary coil of which is connected to the switch of the DC/DC converter; and
   a resistor, coupled to a secondary coil of the current transformer;
   wherein the scaling factor of the current sensing unit is an inverse of a resistance value of the resistor multiplied by a turn ratio of the current transformer.

3. The apparatus according to claim 1, wherein the DC/DC converter is a buck converter, the current estimator determines the signal indicating estimated magnitude of the inductor current of the DC/DC converter, based on multiplication of the sampled signal, the scale factor of the current sensing unit, the duty ratio of the driving signal for controlling the switch, and a ratio of the input voltage to the output voltage of the DC/DC converter when the DC/DC converter is in a continuous or discontinuous conduction mode.

4. The apparatus according to claim 1, wherein the DC/DC converter is a boost converter, the current estimator determines the signal indicating estimated magnitude of the inductor current of the DC/DC converter, based on multiplication of the sampled signal, the scale factor of the current sensing unit, the duty ratio of the driving signal for controlling the switch, and a ratio of the output voltage to difference between the output voltage and the input voltage when the DC/DC converter is in a continuous or discontinuous conduction mode.

5. The apparatus according to claim 1, wherein the DC/DC converter is a buck-boost converter, the current estimator determines the signal indicating estimated magnitude of the inductor current of the DC/DC converter, based on multiplication of the sampled signal, the scale factor of the current sensing unit, the duty ratio of the driving signal for controlling the switch, and a ratio of sum of the output voltage and the input voltage to the output voltage when the DC/DC converter is in a continuous or discontinuous conduction mode.

6. The apparatus according to claim 1, wherein the current estimator determines the signal indicating estimated magnitude of the inductor current of the DC/DC converter, based on the sampled signal and the scale factor of the current sensing unit when the DC/DC converter is in a continuous conduction mode.

7. The apparatus according to claim 1, wherein the duty ratio of the driving signal is equal to a ratio of a control signal to amplitude of a triangle signal, and the driving signal is a square signal based on the control signal and the triangle signal.

8. The apparatus according to claim 1, further comprising:
   a low pass filter, electrically coupled between the current estimator and a control unit of the DC/DC converter, for filtering a voltage control signal into a control signal, wherein the control unit is for outputting the driving signal for controlling the switch;
   a current controller, electrically coupled between the control unit and the current estimator, for outputting the voltage control signal based on difference between a current control signal and the signal indicating estimated magnitude of the inductor current of the DC/DC converter; and
   a voltage controller, electrically coupled to the current controller, for outputting the current control signal based on difference between a command voltage signal and an output signal of the DC/DC converter.

9. The apparatus according to claim 8, wherein the control unit includes:
   a pulse width modulation device for generating a pulse width modulation signal according to the voltage control signal; and
   a driving device for outputting the driving signal based on the pulse width modulation signal.

10. A DC/DC converter assembly, comprising:
    a DC/DC converter including a switch; and
    an apparatus for current estimation of the DC/DC converter, including:
      a current sensing unit for sensing a current passing through the switch of the DC/DC converter and converting the current into a voltage signal;
      a signal sampling unit, coupled to the current sensing unit, for sampling the voltage signal so as to output a sampled signal; and
      a current estimator, coupled to the signal sampling unit, for determining a signal indicating estimated magnitude of an inductor current of the DC/DC converter, based on the sampled signal, a scale factor of the current sensing unit, a duty ratio of a driving signal for controlling the switch, an input voltage and an output voltage of the DC/DC converter;
      wherein the signal sampling unit is configured to be synchronized to the driving signal, and the signal sampling unit samples the voltage signal at a middle of each ON period of the driving signal so as to output the sampled signal.

11. The DC/DC converter assembly according to claim 10, wherein the current sensing unit includes:
    a current transformer, a primary coil of which is connected to the switch of the DC/DC converter; and
    a resistor, coupled to a secondary coil of the current transformer;
    wherein the scaling factor of the current sensing unit is an inverse of a resistance value of the resistor multiplied by a turn ratio of the current transformer.

12. The DC/DC converter assembly according to claim 10, wherein the DC/DC converter is a buck converter, the current estimator determines the signal indicating estimated magnitude of the inductor current of the DC/DC converter, based on multiplication of the sampled signal, the scale factor of the current sensing unit, the duty ratio of the driving signal for controlling the switch, and a ratio of the input voltage to the output voltage of the DC/DC converter when the DC/DC converter is in a continuous or discontinuous conduction mode.

13. The DC/DC converter assembly according to claim 10, wherein the DC/DC converter is a boost converter, the current estimator determines the signal indicating estimated magnitude of the inductor current of the DC/DC converter, based on multiplication of the sampled signal, the scale factor of the current sensing unit, the duty ratio of the driving signal for controlling the switch, and a ratio of the output voltage to difference between the output voltage and the input voltage when the DC/DC converter is in a continuous or discontinuous conduction mode.

14. The DC/DC converter assembly according to claim 10, wherein the DC/DC converter is a buck-boost converter, the current estimator determines the signal indicating estimated magnitude of the inductor current of the DC/DC converter, based on multiplication of the sampled signal, the scale factor of the current sensing unit, the duty ratio of the driving signal for controlling the switch, and a ratio of sum of the output voltage and the input voltage to the output voltage when the DC/DC converter is in a continuous or discontinuous conduction mode.

15. The DC/DC converter assembly according to claim 10, wherein the current estimator determines the signal indicating estimated magnitude of the inductor current of the DC/DC converter, based on the sampled signal and the scale factor of the current sensing unit when the DC/DC converter is in a continuous conduction mode.

16. The DC/DC converter assembly according to claim 10, wherein the duty ratio of the driving signal is equal to a ratio of a control signal to amplitude of a triangle signal, and the driving signal is a square signal based on the control signal and the triangle signal.

17. The DC/DC converter assembly according to claim 10, further comprising:
a low pass filter, electrically coupled between the current estimator and a control unit of the DC/DC converter, for filtering a voltage control signal into a control signal, wherein the control unit is for outputting the driving signal for controlling the switch;
a current controller, electrically coupled between the control unit and the current estimator, for outputting the voltage control signal based on difference between a current control signal and the signal indicating estimated magnitude of the inductor current of the DC/DC converter; and
a voltage controller, electrically coupled to the current controller, for outputting the current control signal based on difference between a command voltage signal and the an output signal of the DC/DC converter.

18. The DC/DC converter assembly according to claim 17, wherein the control unit includes:
a pulse width modulation device for generating a pulse width modulation signal according to the voltage control signal; and
a driving device for outputting the driving signal based on the pulse width modulation signal.

* * * * *